Feb. 26, 1946.   C. A. TEICHERT   2,395,648
AUTOMATIC FUEL MIXTURE CONTROL SYSTEM
Filed March 15, 1940   7 Sheets-Sheet 3
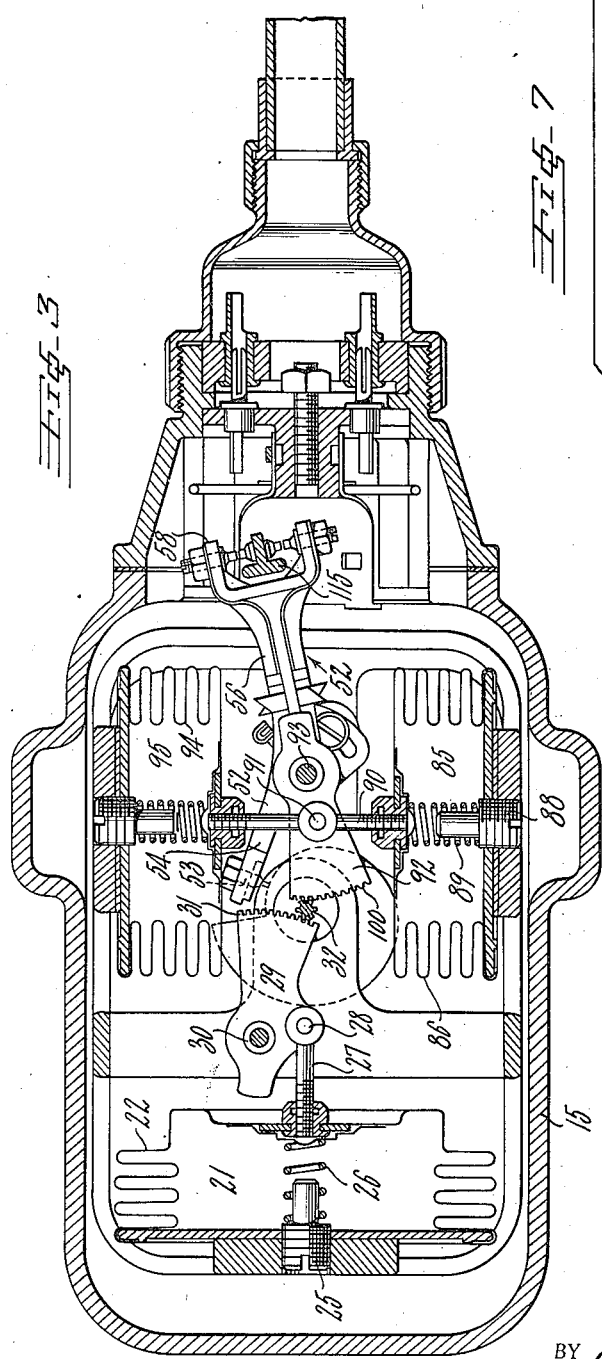
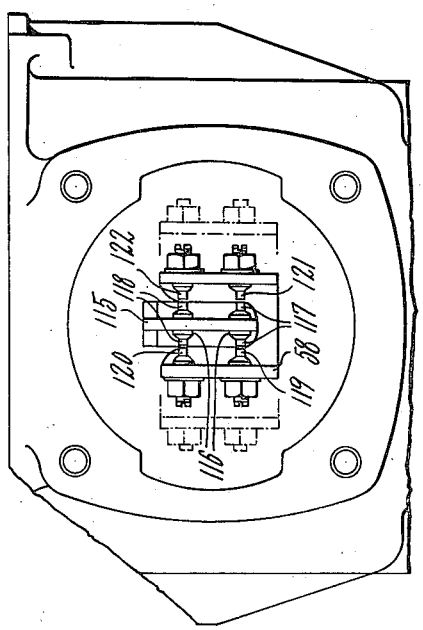
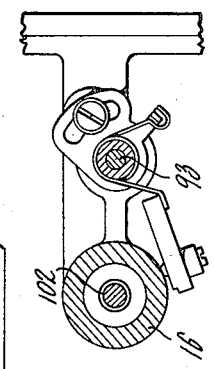
INVENTOR.
CONRAD A. TEICHERT
BY
ATTORNEY.

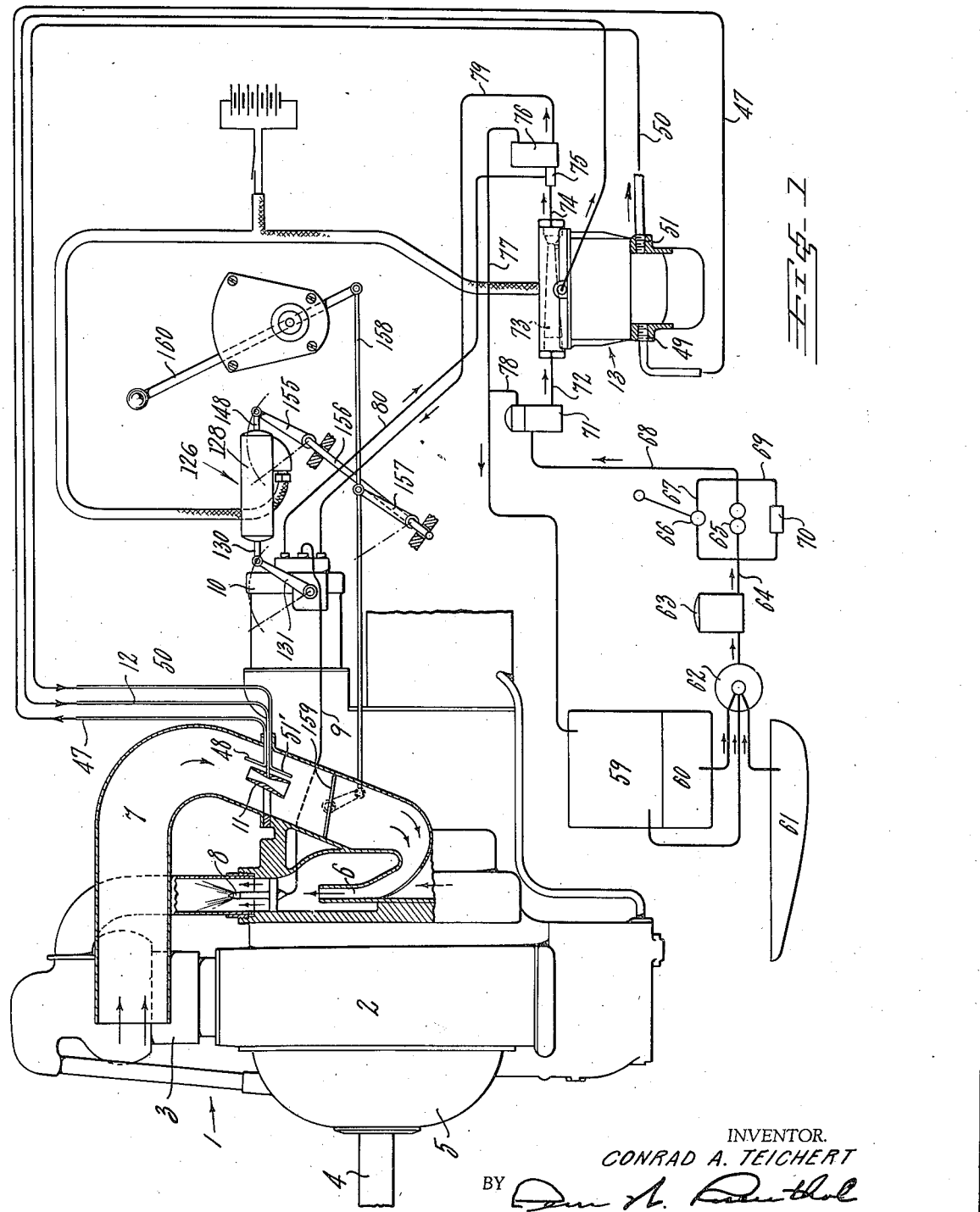

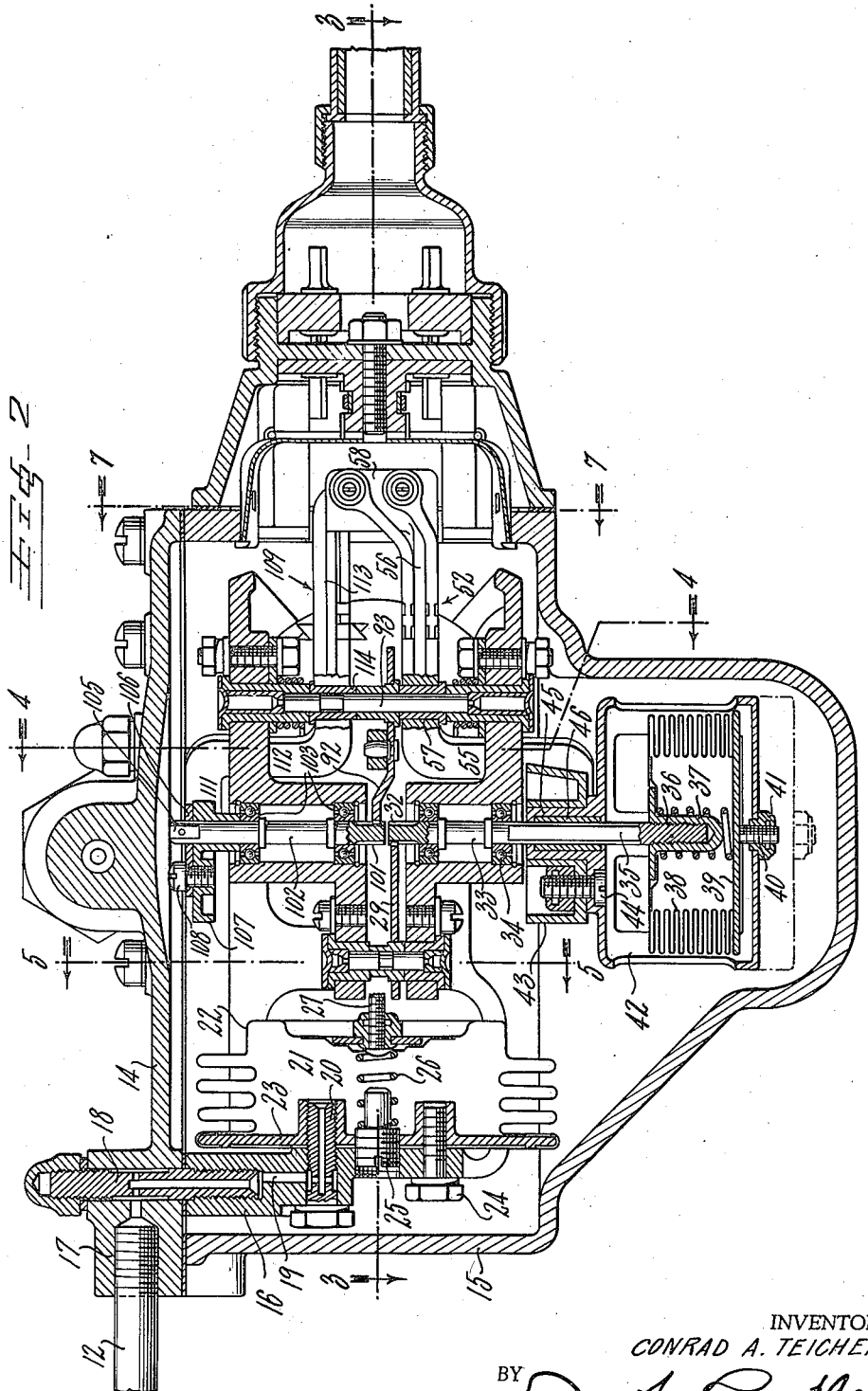

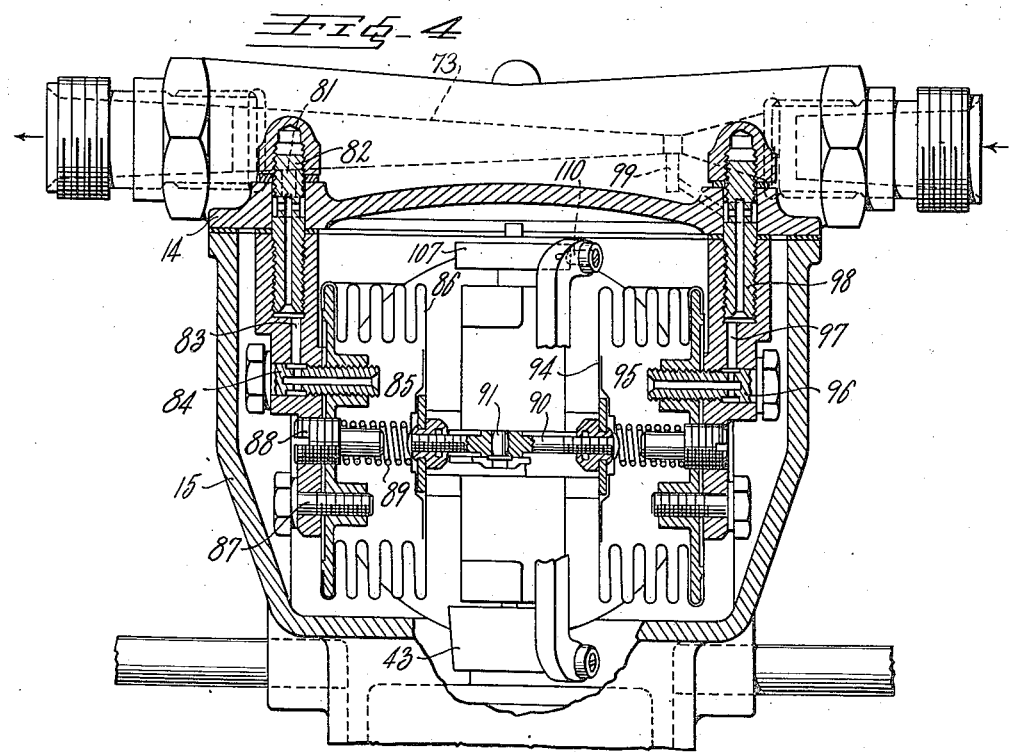
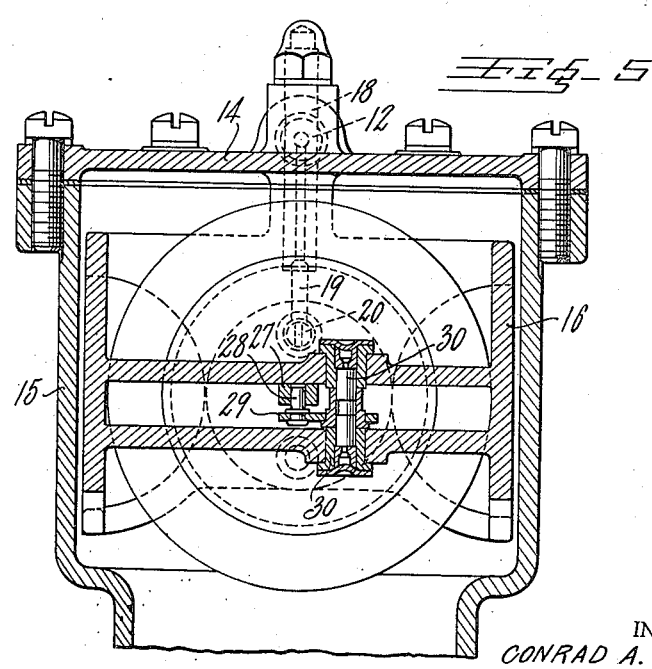

Feb. 26, 1946. C. A. TEICHERT 2,395,648
AUTOMATIC FUEL MIXTURE CONTROL SYSTEM
Filed March 15, 1940 7 Sheets-Sheet 5
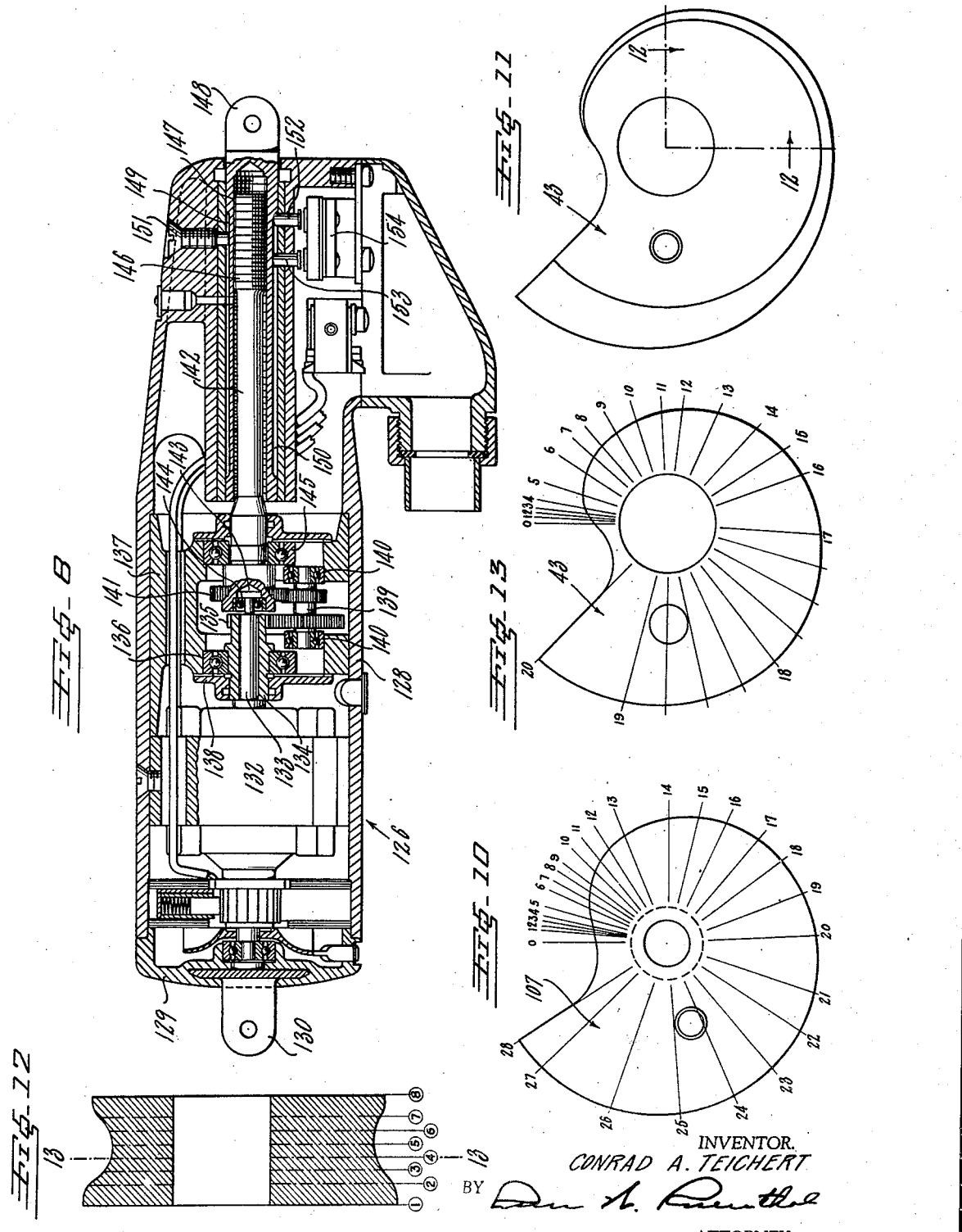
INVENTOR.
CONRAD A. TEICHERT
BY
ATTORNEY.

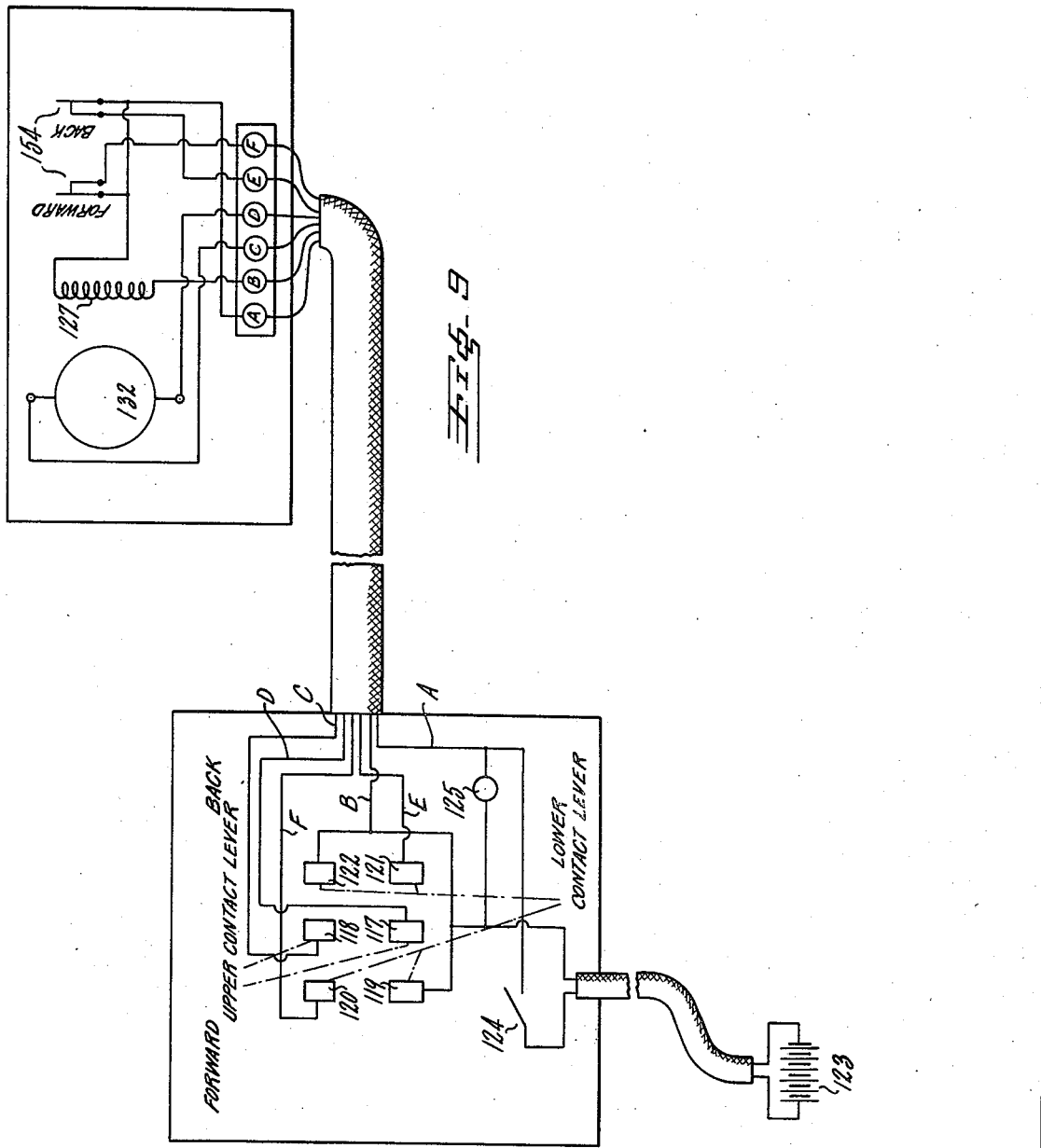

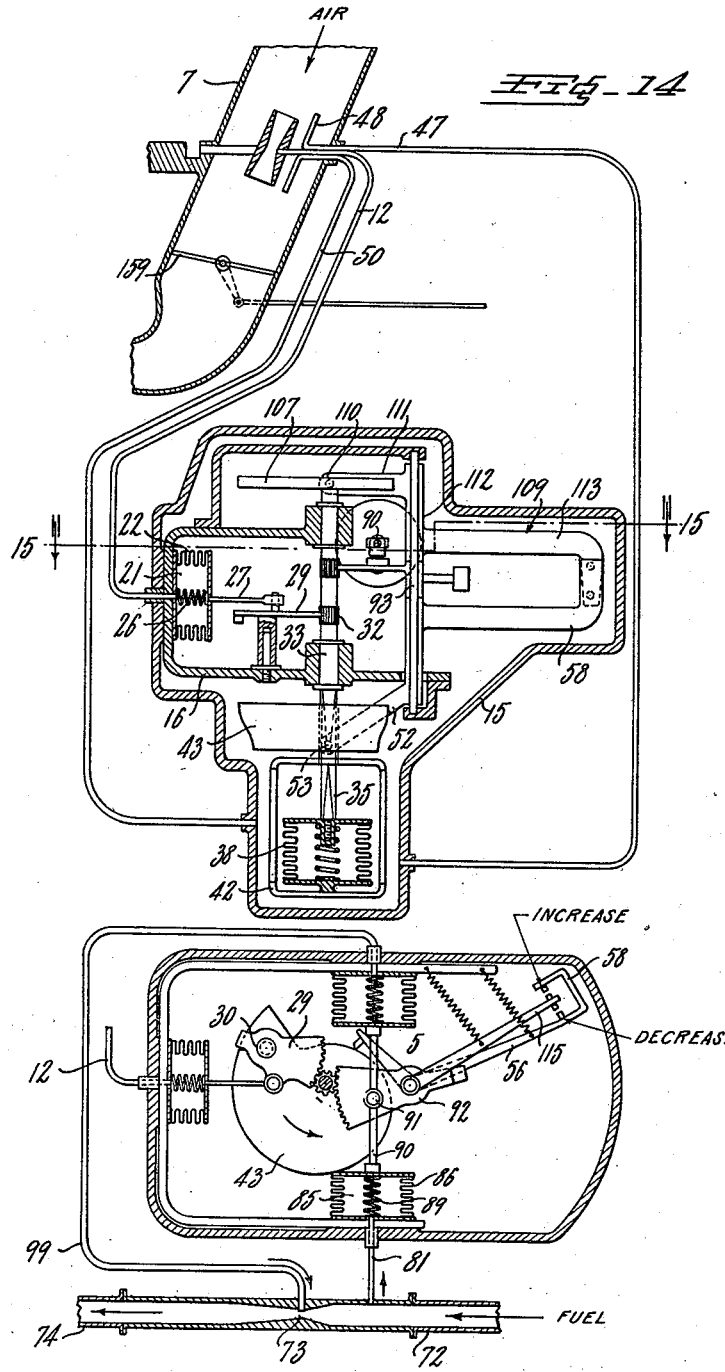

Patented Feb. 26, 1946

2,395,648

UNITED STATES PATENT OFFICE 2,395,648

AUTOMATIC FUEL MIXTURE CONTROL SYSTEM

Conrad A. Teichert, Springfield, Mass., assignor to American Bosch Corporation, Springfield, Mass., a corporation of New York Application March 15, 1940, Serial No. 324,151

4 Claims. (Cl. 261—69)

This invention relates to a method of and apparatus for automatically supplying an aircraft engine with standard fuel-air mixtures of predetermined values covering its complete range of operation encountered in flight, which operation embraces acceleration, cruising, power, climb, dive, all tactical maneuvers and glide.

Another object of the present invention is to provide a suitable means to automatically control the aircraft engine within safe and economical limits not requiring any undue consideration of the pilot and allowing him the proper time to perform his primary duties which, in case of a military aircraft, involve not only offensive, but also defensive action.

More particularly, this invention aims to provide a simple, reliable and accurate method and apparatus for the automatic proportioning of the relative mass-flows of fuel and air as required for safe and economical operation of the engine.

Other aims and advantages of this invention will appear in the following description, considered in connection with the accompanying drawings.

In the accompanying drawings, in which like reference numerals are used to designate similar parts throughout, there is illustrated a single embodiment of preferred form of the invention. The drawings, however, are for the purpose of illustration only and other embodiments within the scope of the appended claims will be apparent to those skilled in the art from a consideration of the form shown in conjunction with the teachings hereof.

In the drawings:

Figure 1 is a diagrammatic illustration of an automatic mixture control system constructed in accordance with the present invention.

Figure 2 shows a vertical section through a ratio regulator which is utilized in the system.

Figure 3 is a section taken upon the line 3—3 of Figure 2.

Figure 4 is a section taken upon the line 4—4 of Figure 2.

Figure 5 is a section taken upon the line 5—5 of Figure 2.

Figure 6 is a detail of an adjustable spring plate which forms a portion of the mechanism of the ratio regulator.

Figure 7 is a section taken on line 7—7 of Figure 2.

Figure 8 is a longitudinal section through the motor for actuating the fuel air ratio adjusting mechanism.

Figure 9 is a wiring diagram of the electric circuits used in the control system.

Figure 10 is a face view of the fuel available cam.

Figure 11 is an upper face view of the fuel required cam.

Figure 12 is a section on line 12—12 of the cam shown in Fig. 11.

Figure 13 is a section taken upon the line 13—13 of Figure 12.

Figure 14 is a diagrammatic illustration of the ratio regulator corresponding to Figure 2, the construction being somewhat simplified for purposes of illustration and also showing fluid pressure connections between the ratio regulator and the air intake of the engine.

Figure 15 represents a similar diagrammatic view corresponding to Figure 3 and showing the fluid pressure connections between the fuel supply passage and pressure responsive devices within the regulator.

Referring to the drawings and particularly to Figure 1, reference numeral 1 indicates an internal combustion engine of a type well known in the art and commonly employed for the propulsion of air-craft. This engine comprises, in general, a crank case 2 upon which are mounted a plurality of cylinders 3 extending radially from the crank case in one or more rows or banks. A crank shaft 4 extends centrally through the crank case and and is connected in the usual manner to pistons operative in the cylinders 3. One end of the crank shaft 4 projects through a nose piece 5 for a sufficient distance to permit the mounting thereon of an aeronautical propeller.

At the opposite, or rear end, the crank shaft 4 is operatively connected to a supercharger 6, adapted to impel air drawn from an air intake conduit 7 past a fuel nozzle 8 positioned in a conduit leading to the air intake valve of one of the cylinders 3. It will be understood that preferably a plurality of fuel nozzles 8 are provided, one for each cylinder, though it will be sufficient for present purposes to describe the operation of the control system in connection with but one of them.

The fuel nozzle 8 is connected by means of conduit 9 to a suitable fuel pump or distributor 10.

The air intake duct 7 opens toward the propeller and is provided at a point between this opening and the supercharger 6 with a venturi indicated at 11. This venturi has an external diameter which is considerably less than the internal diameter of the air intake duct 7 and is maintained in a position centrally of the duct by a light web structure which offers little obstruction to the flow of air through the air intake passage 7. A conduit 12 having an opening into the throat of the venturi extends therefrom to a ratio regulator indicated generally at 13.

The details of the ratio regulator 13 are shown in Figure 2 and subsequent figures and referring particularly to Figures 2 and 14 it will be seen that the conduit 12 is connected to a cover 14 detachably mounted on a casing 15, which houses an internal, removable frame 16. This frame supports and positions all of the parts of the mechanism forming the ratio regulator as hereinafter more fully described. The connection between the conduit 12 and the cover 14 is provided by means of an internally threaded boss 17 on the cover and a passaged bolt 18 which extends through the cover 14 and into an internally threaded bore in the frame 16. The bolt is provided with suitable longitudinal and lateral passages to afford communication from the boss 17 to a passage 19 in the instrument frame 16. A similar passaged bolt 20 extends from the exterior of the frame 16 into an interior chamber 21 of a bellows 22. The bellows 22 is provided with a head 23 having an inwardly projecting interiorly threaded annular boss to accommodate the passaged bolt 20 and a similar boss to accommodate the threaded end of a screw bolt 24, these two bolts serving to rigidly position the head 23 of the bellows 22 upon the interior of the instrument frame 16. An adjusting screw 25, accessible from the exterior of the instrument frame, projects through the central portion of the head 23 and provides an adjustable bearing for positioning a spring 26 the opposite end of which bears upon a suitably reinforced portion of the opposite end wall of the bellows 22. A connecting rod 27 is adjustably connected and adequately sealed to this end of the bellows 22 and, as seen in Figures 3 and 15, its opposite end is connected by a crank pin 28 to a gear sector 29. The gear sector 29 is pivotally mounted on and held in position by shouldered, split bushing 30, extending between and supported by two horizontal ribs extending across the instrument frame 16 in a manner which will be apparent from Figure 5. The gear sector 29 has a toothed portion 31 which is adapted to mesh with teeth 32 formed on the upper end of a gear shaft 33. Referring back to Figure 2 it will be seen that the gear shaft 33 extends to the lower portion of the instrument frame 16 being journalled in ball bearings 34 mounted in a central tubular portion of the frame 16 to the end that the shaft 33 will be held rigidly against forces tending to move it in a longitudinal direction while free rotation thereof will be permitted. The shaft 33 is provided with flattened surfaces 35 intermediate the ends thereof and the lower end has a threaded portion 36 adapted to mate with internal threads of a thimble 37 which projects into and forms a reinforcing portion for the upper head of a density bellows 38. The lower head 39 of the bellows 38 is adjustably attached by a threaded stud 40 and a nut 41 to a retainer frame 42 which surrounds bellows 38 in a manner to prevent lateral displacement thereof but to permit, and move with, longitudinal displacements of the head 39. A cam 43 is fastened by a screw 44 to the upper surface of the retainer frame 42 and an annular extension 45 of the frame 42 projects upwardly through a central opening in the cam 43. A bushing 46 within the extension 45 is provided with internally flattened surfaces to mate with the flattened surface 35 of the shaft 33.

It will be noted that the cam 43 is of considerable thickness and in its contour differs between different horizontal sections thereof in a manner hereinafter more fully described. It will however be seen from the structure of the parts so far described that the bellows 38 together with its retaining frame 42 and the cam 43 which is mounted thereon will rotate with the shaft 33 and it will further be seen that while the shaft 33 is held against longitudinal movements nevertheless the head 39 of the bellows 38 will move upwardly or downwardly as the pressure upon the exterior of the bellows 38 varies relative to the pressure upon the interior of this bellows. The frame 42 will also move up and down with the head 39 and accordingly the cam 43 will likewise move with the frame.

Referring back to Figure 1, it will be seen that the means for varying the pressure upon the exterior of the bellows 38 comprises a conduit 47 which is communicatively connected with an impact tube 48 opening against the direction of flow of the air flowing through the air intake duct 7. The conduit 47 leads to a threaded opening 49 extending through the wall of the casing 15 and a return conduit 50 leads from a second threaded opening 51 to a tube 51' which opens in the direction of the flow of air through the air intake 7 at a point adjacent the discharge end of the venturi 11.

It will be seen that the pressure conditions within the control regulator 13 and upon the exterior of the density bellows 38 as well as upon the exterior of the bellows 22 will simulate the density conditions around the venturi 11 allowing for a certain mass flow of air in the conduits 47 and 50. The differential pressure created by the mass flow of air through the venturi 11 being transmitted to the interior of the bellows 22 by a conduit 12 and the exterior thereof by the conduits 47 and 50 is translated by the mechanism comprising the gear segment 29 and a gear shaft 33 into angular movements of the cam 43 while the differences between the fixed density within the bellows 38 and the variable density upon the exterior thereof results in a vertical adjustment of the cam 43 along the gear shaft 33. The contour of the cam 43 will be more particularly described in connection with figures 11 et seq. For the moment it will suffice to say that the variations in the contour both angularly and longitudinally of the cam are effective to actuate a bell crank 52 one end of which is in contact with the cam through a contact screw 53 which is adjustable in a lower horizontal portion 54 of the crank. The bell crank 52 is formed with an upwardly extending portion 55 and a second horizontally extending portion or arm 56. A pivot bearing 57 is provided in the arm 56 adjacent the vertical portion 55 and the opposite end terminates in a contact yoke 58. The contacts upon this yoke coact with contacts which are movable in accordance with the fuel demand upon the engine in a manner which will now be described.

Fuel is supplied from the usual main and reserve tanks 59, 60, and 61 (see Fig. 1) which are selectively connected, by a three way valve 62 to a filter 63, and thence by way of a conduit 64 to an engine driven pump 65. In starting a manual pump 66 provided in a by-pass conduit 67 is utilized instead of the gear pump and is connected into a common discharge conduit 68. A return conduit 69 connects the discharge conduit 68 with the intake conduit 64 by way of a return valve 70. The discharge conduit 68 leads to a vapor eliminator 71 and thence by way of conduit 72 to a Venturi passage 73 provided upon and preferably formed integrally with the cover 14 of the ratio regulator 13. The discharge end of the venturi 73 is connected by conduit 74 to an aspirator 75 and a second vapor eliminator 76. Vapors from the top of the vapor eliminator 76 are returned to the top of fuel tank 59 by way of a return conduit 77 and the upper portion of the vapor eliminator 71 is connected to the return conduit 77 by conduit 78. From the lower portion of the second vapor eliminator 76, supply conduit 79 leads to the fuel injector 10. This fuel injector 10 may be either a fuel pump or a distributor suitable forms of either of which are well known in the art and commercially available. A return conduit 80 leads the excess fuel from the injector 10 back to the aspirator 75.

Referring to Figure 4, it will be seen that the venturi 73 through which the fuel passes from the supply pump 65 to the injector 10 is formed integrally with the cover 14 of the ratio regulator. A passage 81 leading from a portion of the venturi adjacent the discharge end thereof is connected by way of a passaged screw bolt 82, which extends through the cover 14 into an internally threaded bore of the instrument frame 16, and thence by way of passage 83 in said frame and passaged screw bolt 84 with the interior chamber 85 of a bellows 86. The screw bolt 84 together with a fastening screw 87 act to rigidly secure the bellows 86 to the instrument frame and an adjustable screw 88 accessible from the interior of the instrument frame permits the adjustment of the bellows spring 89. The free end of the bellows 86 is operatively connected as shown in Fig. 3 by a connecting rod 90 with a crank pin 91 on a gear segment 92 in a manner to oscillate the gear segment about its pivot 93. The opposite end of the connecting rod 90 is attached to the free end of a bellows 94, the interior chamber 95 of which is connected by means of a passaged screw bolt 96 with a passage 97 in the instrument frame 16 and thence by way of a passaged screw bolt 98, which extends through the cover 14, with a passage 99 formed in the cover 14 which passage opens into the most restricted portion of the venturi 73. The connecting rod 90 is thus reciprocated as a result of the differential pressure created by the flow of fuel through the venturi 73 these movements being translated to angular movements of the gear segment 92 about its pivot 93. The teeth 100 of the gear segment 92 (see Figures 2 and 3) mesh with a toothed portion 101 upon the lower end of a shaft 102. This shaft is mounted in ball bearings 103 which are retained in a tubular portion of the instrument frame 16 by suitable spring rings to the end that the shaft 102 is rigidly held against longitudinal movement while rotation thereof is freely permitted. At its upper end the shaft 102 has a flattened portion 105 upon which is mounted a cam plate 106. A cam 107 is rigidly fastened to the cam plate 106 by a screw 108 and for this reason rotates with the shaft 106. A contact lever 109 is so positioned that a ball point screw 110 at one end thereof is in contact with the cam 107. The lever 109 comprises a horizontally extending portion 111, a downwardly extending portion 112 and a horizontally extending arm 113. A bushing 114 extends through a suitable opening in this portion of the lever to pivotally support the same. The lever terminates in a downwardly extending portion 115 which carries two terminal clips 116 carrying contacts 117 and 118. This downwardly extending portion 115 of the lever 109 extends as shown in Figure 7, between the two forks of the contact yoke 58 on the lever 52. This yoke carries contacts 119, 120, 121 and 122, arranged with two contacts in each of the forks of the yoke, these being aligned in pairs with the contacts 117, 118 of lever 109.

Referring to Figure 9 which discloses the electrical circuit, the contacts 118 and 117 of lever 109 are shown in a neutral position between the contacts 119, 120, 121 and 122 of the lever 52. The contacts 119 and 122 are electrically connected and have a common lead to a battery 123 the opposite pole of which is connected through a manual switch 124 to a lead A. A pilot light 125 is placed in a suitable shunt circuit to visually indicate to the pilot that the battery circuit is closed and in operation. The lead A is connected directly to the motor panel and a second lead B extends directly from these contacts to the motor panel. A lead C connects contact 118 directly with the motor panel and a similar lead D connects the contact 117 of the same lever with the motor panel. Contacts 121 and 120 are similarly and separately connected to the motor panel by leads E and F respectively. The lead A is connected in the motor housing to one of the reversing switches designated Back on the drawings and thence by way of lead E to contact 121. A shunt from this lead A extends to the other of the reversing switches designated Forward on the drawings and thence back to the contact 117 by way of lead F and also by way of the field winding 127 to the lead B, and thereby directly with contacts 122 and 119.

The details of the motor control mechanism 126 will be seen in Figure 8 in which 128 indicates a housing having an end cap 129 which cap is provided with a projecting shank or ear 130 perforated for pivotal connection with a fuel control lever 131 of the fuel injector 10. An armature 132 is journalled within the housing 128 in suitable ball bearings provided in the motor housing and in the end cap 129. A shaft 133 of the armature extends through and is rigidly connected with a bushing 134 which carries a driving gear 135. Ball bearing 136 positioned in a frame 137 and retained by a cover 138 provides a journal for the bushing 134 which rotates with the shaft 133. A gear and pinion 139 journalled in ball bearings 140 supported by the frame 137 are positioned in such a manner that the gear meshes with the gear 135 of the bushing 134 while the pinion meshes with gear 141 formed at one end of a shaft 142. A countersunk portion 143 in the end of shaft 142 retains a ball bearing 144 which provides a journal for a reduced end of the shaft 133. The shaft 142 is journalled in ball bearings 145, supported by the frame 137. The shaft 142 is provided at its opposite end with a threaded portion 146 adapted to coact with internal threads in a hollow shaft 147 which surrounds the shaft 142 for the major portion of its length, and is flattened at its outer end to provide a perforated ear 148. A longitudinal slot 149 is provided in the external surface of the upper side of shaft 147 for the major portion of the length thereof and a similar longitudinal slot 150 is provided on the lower side of the shaft. A set screw 151 extends through the housing 128 and is provided with an end portion adapted to fit in the slot 149 in a manner to prevent angular movement of the shaft 147 but to permit longitudinal movements of the shaft for the length of the slot 149. A pair of contact pins 152 and 153 are adapted to project into the slot 150, in such a manner that the contact pin 152 will be forced outwardly when the hollow shaft 147 approaches its innermost position and the contact pin 153 will be forced outwardly as shaft 147 approaches its outermost limit of travel. The contact pins 152 and 153 are positioned to actuate the reversing switches 154 which determine the direction of rotation of the rotor 132.

As shown in Figure 1, the entire motor control mechanism 126 is mounted for longitudinal displacement, one end being pivotally mounted to the fuel control lever 131 and the other end being pivotally mounted by the ear 148 to a crank 155 which crank is rigidly connected to a shaft 156. A crank arm 157 also mounted upon the shaft 156 is connected to a throttle rod 158 at a point intermediate the ends thereof. A throttle valve 159, positioned on the discharge side of the venturi 11 in the air intake passage 7, is operably connected to the rod 158 and may be adjusted, through throttle control lever 160, by the pilot to give any desired degree of throttle opening and corresponding setting of fuel control lever 131 after which setting the desired fuel ratio is maintained regardless of changes in factors such as altitude by movement of the rod 130 into and out of the motor housing, under the influence of the integrator 13.

The operation of the electrical circuit in conjunction with the motor will now be described. Referring to Figure 9 it will be seen that when the switch 124 is closed, current is continuously supplied from the battery through the lead A, the field coil 127 and back by way of lead B. The circuit through the armature of the motor comprises the leads C and D which terminate in the contacts 117 and 118, and this circuit is therefore normally open. If, however, the contacts 117 and 118 are moved to the left of the position shown in Figure 9, a movement which is affected by relative motion of the levers 52 and 109, then the circuit will be closed between contacts 117 and 119, and between 118 and 120 to the end that a closed circuit is provided between the lead D and the negative pole of the battery, while the lead C is connected by way of lead F through the "forward" reversing switch if this is closed and thence through the lead A which is connected by way of switch 124 to the opposite pole of the battery. This results in rotation of the motor in a forward direction and this rotation forces the hollow shaft 148 outwardly until the contact pin 153 is forced outwardly as the end of groove 150 is approached. The outward movement of the contact pin 153 opens the "forward" reversing switch so that current no longer flows through the armature of the motor. It will be seen that rotation of the motor in the "forward" direction has the effect of increasing the overall length of the motor, that is, it will increase the distance between the point at which the ear 148 is pivoted to the crank arm 155 and the point at which the ear 130 is pivoted to the lever 131. Accordingly the upper end of lever 131 is moved toward the left from the position shown in Figure 1 and the fuel supplied by the injector 10 is increased. The relative richness of the fuel air ratio of the mixture supplied to the engine is maintained regardless of changes in elevation and this relative richness of the mixture may be altered by any new setting of the manual throttle 160 actuation of which will simultaneously increase or decrease the quantity of fuel and air supplied to the engine.

Assuming that the contacts 117 and 118 are now separated from the contact 119 and 130 back to the position shown in Figure 9, the "forward" reversing switch will now be open, the armature circuit through C and D will be open. The battery circuit will be closed through the lead A, filed coil 127, and lead B. As the contacts 117 and 118 move farther to the right relative to the other contacts, circuits will be closed through contacts 117 and 121 and between 118 and 122. Accordingly the circuit through the armature 132 of the motor 126 will be closed through the leads C and D but in this case the lead C will be connected by way of contact 122 with the negative pole of the battery 123, while the lead D will be connected to the battery by way of contacts 117 and 121, lead E and the "back" reversing switch and thence by way of lead A and switch 124 to the positive pole of the battery. The motor armature will now rotate in the opposite direction until the contact pin 152 is forced outwardly by the action of the end of the slot 150 as the shaft 147 moves longitudinally inward toward the motor, thus reversing the action previously described, the relative richness of the mixture now being decreased rather than increased.

The operation of the electrical circuit in connection with Figure 9 has been described with reference to movement of the contacts 117 and 118 to the right or to the left of the position shown in this figure. It will be understood this movement should be considered as being relative to the other contacts 119, 120, 121 and 122, these contacts being mounted upon two forks of the yoke 56 on the end of lever 52 are separately movable to the right or left relative to the contact 117 and 118 due to the action of the cam 43 acting through the contact screw 53 upon the bell crank 52. Thus it will be seen that movement of the four outer contacts 119, 120, 121 and 122 is a function of the difference in density upon the exterior and interior of the density bellows 38 and of the mass flow of air through the venturi 11 which is made effective upon the cam 43 through the action of the bellows 22. On the other hand the movement of the contacts 117 and 118 between the yolk and of the lever 52 is a function of the differential pressure of the flow of fuel through the venturi 73 which pressure is made effective through the bellows 86 and 94 acting through the intermediary of crank 90, crank pin 91, gear segment 92, shaft 102 and cam 107 upon upper contact lever 109 to move the contacts 117 and 118 within the confines of the yoke 58 regardless of the position of the latter. Thus it will be seen that the fuel air ratio is adjusted in accordance with an integration of several functions including the mass flow of air through the air inlet of the engine, the air density condition within the air intake, and the flow of fuel to the supply means. This integration is effected by means of a mechanism embraced in a single housing all of the elements of which are mounted upon a single frame in such a manner that all parts thereof are readily accessible for adjustment, repair or replacement.

The layout of the fuel available cam 107 is shown in Figure 10. The cam profile is marked with station numbers the percentage of effective cam lift or percentage of capacity position of which can be obtained from the following table.

| Station | Angle | Cam lift from center | Percent capacity position |
|---|---|---|---|
| 1 | 5°–36' | 0.3392 | 17.82 |
| 2 | 7°– 0' | .3468 | 19.35 |
| 3 | 9°– 7' | .3560 | 21.2 |
| 4 | 11°–33' | .3685 | 23.72 |
| 5 | 16°– 6' | .3870 | 27.4 |
| 6 | 23°–25' | .4130 | 32.6 |
| 7 | 28°– 0' | .4270 | 35.4 |
| 8 | 32°–12' | .4370 | 37.4 |
| 9 | 36°– 3' | .4500 | 40.0 |
| 10 | 43°–48' | .4698 | 43.98 |
| 11 | 50°–27' | .4870 | 47.45 |
| 12 | 57°–27' | .5020 | 50.4 |
| 13 | 67°–33' | .5240 | 54.8 |
| 14 | 89°–36' | .5655 | 63.1 |
| 15 | 104°– 0' | .5900 | 68.0 |
| 16 | 116°– 6' | .6085 | 71.75 |
| 17 | 131°–12' | .6330 | 76.51 |
| 18 | 144°–30' | .6512 | 80.3 |
| 19 | 160°– 0' | .6740 | 84.75 |
| 20 | 176°–48' | .6945 | 88.92 |
| 21 | 198°–24' | .7190 | 93.8 |
| 22 | 213°–42' | .7350 | 97.1 |
| 23 | 229°–48' | .7510 | 100.1 |
| 24 | 246°– 0' | .7675 | 103.4 |
| 25 | 266°– 0' | .7835 | 106.7 |
| 26 | 238°–30' | .7993 | 109.9 |
| 27 | 315°– 0' | .8150 | 113.0 |
| 28 | 325°– 0' | .8150 | |

The angular position of cam 107 can be accurately established; by means of the mechanism illustrated, having a definite relationship to the weight of the fuel passing through the Venturi constriction 73, this being efficient over the flow and viscosity range encountered. The weight of fuel delivered by the injector 10 varies directly with the rotative speed, position of capacity control lever 131, and the specific gravity of the fuel. Since the specific gravity of the fuel now issued to service does not vary more than 1% and the performance of the injector is held within 1½% it can be considered that the delivery of fuel by weight is affected only by the rotative speed and the setting of the capacity control lever 131. In accordance with a generally accepted source of measurements as provided by the differential pressure across an orifice in the fuel line the weight of fuel delivered by the injector can be considered to vary as the square root of the differential pressure across the Venturi constriction 73 formed in the cover member.

The differential pressure created by the flow of fuel through the Venturi constriction 73 having been transmitted by the communicating passages previously described to the interior of the two bellows 86 and 94 is transmitted by the mechanism comprising the connecting rod 90 with the crank 91, the gear segment 92, shaft 102, and converted into angular movements of the cam 107. The layout of the cam may be made such that the following relationship exists:

$$\frac{\text{Weight of fuel in lbs.}}{=\sqrt{\text{differential pressure across venturi (73)}}} = \sqrt{\text{degrees cam rotation}}$$

The layout of the fuel required cam 43 is shown in Figures 11 and 13. The cam is marked with station numbers. The percentage of effective cam lift, also percentage of capacity position corrected for density changes of the air surrounding Venturi constriction 11 can be obtained for an altitude of 5 thousand feet from the following table:

| Station | Angle | Cam lift from center | Percent effective cam lift | Percent capacity position |
|---|---|---|---|---|
| 1 | 3°–54' | 0.3468 | 19.33 | 18.75 |
| 2 | 5°– 0' | .3568 | 21.35 | 21.82 |
| 3 | 6°–59' | .3678 | 23.55 | 25.42 |
| 4 | 10°–17' | .3782 | 25.65 | 29.55 |
| 5 | 18°–12' | .399 | 29.8 | 36.6 |
| 6 | 31°–42' | .424 | 34.4 | 45.4 |
| 7 | 41°– 9' | .436 | 37.2 | 50.4 |
| 8 | 49°–24' | .447 | 39.42 | 54.3 |
| 9 | 59°–36' | .460 | 42.0 | 58.6 |
| 10 | 72°– 0' | .4782 | 45.7 | 63.8 |
| 11 | 86°–30' | .5001 | 50.1 | 69.2 |
| 12 | 96°–54' | .5161 | 53.25 | 72.1 |
| 13 | 114°– 0' | .542 | 58.4 | 76.9 |
| 14 | 133°– 0' | .584 | 66.7 | 81.9 |
| 15 | 147°–48' | .6173 | 73.5 | 85.7 |
| 16 | 159°–54' | .658 | 81.6 | 88.5 |
| 17 | 184°– 0' | .712 | 92.4 | 94.5 |
| 18 | 232°–30' | .791 | 108.2 | 105.0 |
| 19 | 285°–30' | .850 | 120.07 | 113.7 |
| 20 | 315°– 0' | .850 | | |

Along its longitudinal axis, the cam presents varying sections as may be seen in Figure 12, the profile at any given horizontal section corresponding to the fuel requirements for a definite density condition. Sections corresponding to altitudes of −5000 to +20,000 feet together with the sections corresponding to 5000 foot intervals between these two positions have been marked on the drawings. The profile corresponding to an elevation of 5000 feet is shown in Figure 13.

In general a reference point on the curved outside contour of cam 43 may be determined as follows:

(a) The angular position of this reference point in degrees of cam rotation varies with the weight of the air being consumed by the aircraft engine and the density of the air surrounding the venturi 11.

(b) The location of this point along the longitudinal axis of the cam varies with the air density surrounding venturi 11.

(c) The radial distance from this reference point to the center of the cam as given in above table varies with the fuel-air ratio required for best overall performances of the engine. This fuel-air ratio is determined by laboratory and flight tests of the engine and may vary for different types of engines.

It will be understood that in practice the conduits 12, 47 and 50 between air intake 7 and the ratio integrator 13 are preferably heat insulated so that the temperature condition present in the air intake 7 will prevail in the ratio integrator. This will insure that the density conditions within the regulator 13 will be the same as within the intake 7 except for a certain mass flow of air through the conduits 47 and 50 correction for which can be made.

Having thus described the invention, what is claimed as new is:

1. A system for regulating the fuel-air ratio of an air-craft engine, a regulator including a housing, a removable frame within said housing, a plurality of pressure responsive devices mounted upon said frame, passaged means providing communication between one of said pressure responsive devices and a Venturi constriction in the air intake of the engine, passaged means providing communication between a Venturi constriction in a fuel supply conduit of the engine and another of said pressure responsive devices, said frame having passages therethrough providing a portion of each of said passaged means, a removable cover for said housing having passages therein, passaged screw bolts extending through said cover into said frame for positioning said frame and providing communication between the passages in said cover and the passages in said frame, mechanism mounted upon said frame and actuated by said pressure responsive devices, and power means controlled by said mechanism for translating movements thereof into corresponding adjustments of one of the constituent fluids of the fuel-air mixture to maintain a desired fuel-air ratio for a given operating condition.

2. In a system for controlling the fuel-air ratio of an air-craft engine, a regulator for controlling the operation of a fuel-air ratio adjusting mechanism, said regulator including a bellows, means providing communication between the interior of said bellows and a Venturi constriction in the air intake of the engine, a gear shaft, means comprising a connecting rod and a gear segment for transmitting motion from said bellows to said shaft, a cam mounted upon said shaft for rotation therewith, a density bellows mounted upon said shaft for rotation therewith and having a free end wall movable in response to variations between the density of the air upon the interior and the exterior thereof, means for transmitting movements of said free end of said density bellows to move said cam longitudinally of said shaft, and means actuated by said cam for regulating the fuel supply of the engine, whereby the fuel-air ratio is maintained in accordance with a desired value for any given rate of flow of air to the engine at any given density thereof.

3. In a system for controlling the fuel-air ratio of an air craft engine, a regulator for controlling the operation of a fuel air ratio adjusting mechanism, said regulator including a bellows, means providing communication between the interior of said bellows and a Venturi constriction in the air intake of the engine, a gear shaft, means comprising a connecting rod and a gear segment for transmitting motion from said bellows to said shaft, a cam mounted upon said shaft for rotation therewith, a second bellows, means for providing communication between the interior of said second bellows and a fuel supply line of said engine, a second shaft mounted coaxially with said first mentioned shaft, means comprising a connecting rod and gear segment for transmitting movements of said second bellows into angular movements of said shaft, a cam mounted upon said last mentioned shaft, and means independently responsive to the action of said cams and effective to compare fuel and air flows to set the fuel control mechanism of the engine, whereby the quantity of fuel to the engine is adjusted to maintain a given ratio with the rate of flow of air to the engine.

4. In a system for controlling the fuel-air ratio of an air-craft engine, a fuel-supply adjusting mechanism, a regulator for controlling the operation of said mechanism, said regulator including a bellows, means providing communication between the interior of said bellows and a Venturi constriction in the air intake of the engine, a gear shaft, means comprising a connecting rod and a gear segment for transmitting motion from said bellows to said shaft, a cam mounted upon said shaft for rotation therewith, a second bellows, means for providing communication between the interior of said bellows and a fuel supply line of said engine, a second shaft mounted coaxially with said first mentioned shaft and means comprising a connecting rod and gear sector for translating movements of said second bellows into angular movements of said second shaft, a cam mounted upon said second shaft, a pair of levers one of which is actuated by said first mentioned cam, and the other of which is actuated by said last mentioned cam, and electrical contacts mounted upon said levers operative to control the electrical circuit of a reversible motor for setting the fuel supply adjusting mechanism of the engine, whereby the fuel-air ratio is maintained at a desired value for any given rate of flow of air and fuel to the engine.

CONRAD A. TEICHERT.